June 18, 1929.   C. S. HIGGINS ET AL   1,717,975
GARDEN IMPLEMENT
Filed May 5, 1927
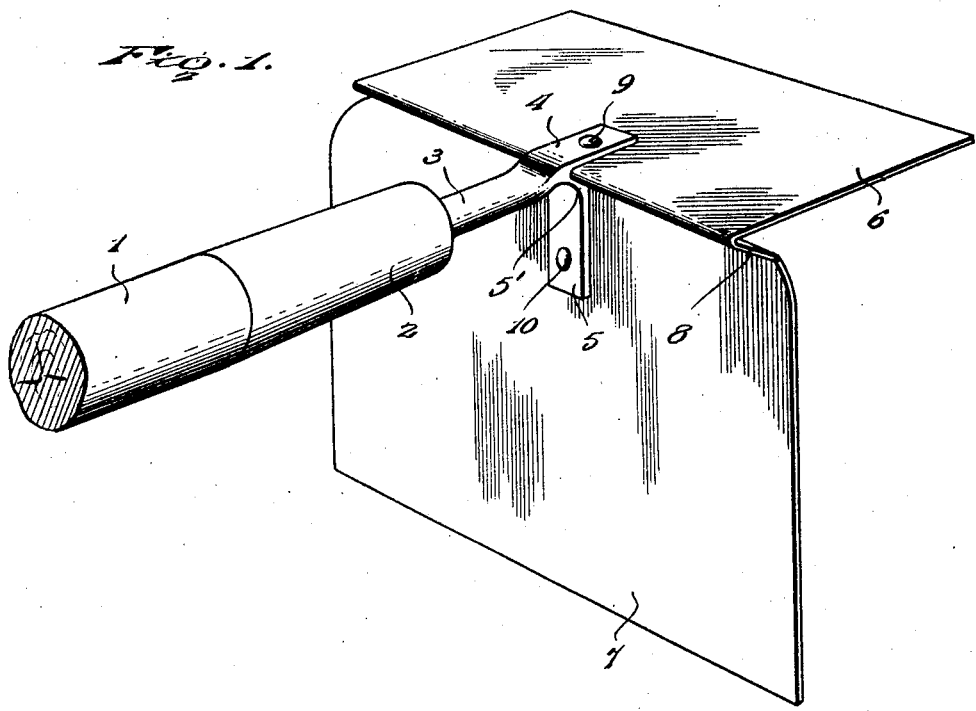
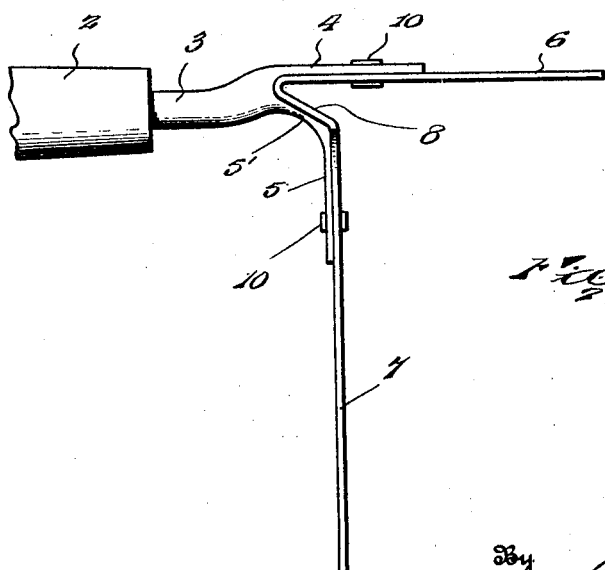
Inventors
C. S. Higgins.
G. Rome.

Patented June 18, 1929.

1,717,975

UNITED STATES PATENT OFFICE.

CHARLES S. HIGGINS AND GUSTAVE ROME, OF MISSION, TEXAS.

GARDEN IMPLEMENT.

Application filed May 5, 1927. Serial No. 189,070.

This invention relates to garden implements and more particularly to an implement which may be referred to as a combined hoe and spade and is to be employed to uproot weeds and grass and also to break up the ground and properly dispose the same about the roots of growing plants.

When a hoe of an ordinary construction is employed, it is sometimes difficult to properly remove weeds and the like which are deeply rooted and it is also sometimes difficult to break up soil which has become sun baked. Therefore, one object of the invention is to provide an implement having a blade which resembles an ordinary hoe blade and a second blade extending longitudinally from the shank which connects the blades with the handle of the hoe and projects transversely from opposite sides of the handle so that it may be forced into the ground by foot pressure and deeply rooted weeds easily removed or soil which has become hard easily broken up.

Another object of the invention is to allow the two blades to be formed from a single strip of strong sheet metal. By having the two blades formed from a single piece of metal they will constitute a unitary structure and will be very strong as each will serve to brace the other.

Another object of the invention is to provide an implement with a single shank having its free end portion formed with arms engaged with the two blades.

The invention is illustrated in the accompanying drawing, wherein

Figure 1 is a perspective view of the improved garden implement with the handle broken off, and Fig. 2 is a view showing the implement in side elevation with the handle broken off.

The improved garden implement includes a handle 1 which may be of any desired length and has its forward end portion covered by a ferrule 2 which serves to reinforce the handle and prevent it from being split when the shank 3 is driven into it and also serves to prevent the handle from being split or broken when the implement is in use. The shank may be formed of any desired strong metal and has its free end portion split longitudinally to provide arms 4 and 5. The arm 4 extends longitudinally of the shank but the arm 5 extends diagonally away from the arm 4 and is then bent to extend downwardly at substantially right angles to the arm 4. Therefore, the arm 5 may be referred to as a lower or depending arm and the arm 4 as an upper or longitudinally extending arm.

The blades 6 and 7 are formed from a single strip of strong sheet metal, such as steel or the like, and this strip is bent intermediate its length to provide a flange portion 8 disposed at an incline between the two blade forming portions and adapted to rest upon the diagonally disposed upper end portion 5' of the arm 5 when the shank is secured to the blades by the rivets 9 and 10. By this arrangement the flange will serve to brace the blade 7 against upward movement or pivotal movement upon the rivet 10 when employed in the usual manner as a hoe and the flange will also serve to brace the blade 6 against turning movement upon the rivet 9 and provide the blade 6 with a rolled rear edge which will reinforce it and prevent it from cutting into a shoe when the operator forces the blade into hard ground by pressing against its rear edge with his foot. If desired, the arms 4 and 5 may be secured to the blades by welding or in any other manner found practical.

When this implement is in use, it may be employed as a hoe in the usual manner by holding the handle and cutting into the ground with the blade 7 or the blade 6 may be engaged with the ground and either forced into the ground by pressure upon the handle or by placing a foot upon its rear edge and forcing the blade downwardly. It should be noted that the blade 6 is preferably of less width than the blade 7 so that it may be very easily forced into the ground. The blade 6 may also be employed to cut weeds or plants off close to the ground without disturbing the roots and afterwards remove the roots by either of the blades or leave them in the ground. We have, therefore, provided an implement which will be very strong and durable and may be very easily used.

Having thus described the invention, we claim:

A garden implement comprising a handle, a shank extending forwardly from said handle and having its forward end portion provided with arms, one arm extending longitudinally of the shank and the other extending forwardly from the shank beneath the first arm at a downward incline and then downwardly at right angles to the first arm, and an operating element consisting of a sheet metal blank bent transversely to provide a main blade and an auxiliary blade projecting forwardly from the upper end thereof, the main blade being bent transversely in spaced relation to its upper end to provide a main portion extending at right angles to the auxiliary blade and an upper portion extending rearwardly at an upward incline to the rear end of the auxiliary blade, said operating element being set in place against the shank with the first-mentioned arm thereof overlying the upper surface of the auxiliary blade and the second arm bearing against the rear surface of the main blade and fitting against the under surface of the rearwardly extending portion thereof, and means to firmly secure the arms to the blades of the operating element.

In testimony whereof we affix our signatures.

CHARLES S. HIGGINS. [L. S.]
GUSTAVE ROME. [L. S.]